United States Patent [19]
Knueven

[11] Patent Number: 5,773,063
[45] Date of Patent: Jun. 30, 1998

[54] METHOD FOR PRESERVING ANIMAL FEED WITH SODIUM BISULFATE AND COMPOSITION THEREOF

[75] Inventor: Carl Joseph Knueven, Bowling Green, Ohio

[73] Assignee: Jones-Hamilton Co., Newark, Calif.

[21] Appl. No.: 811,701

[22] Filed: Mar. 5, 1997

[51] Int. Cl.$^6$ .............................. A23K 3/02; A01F 25/00
[52] U.S. Cl. ......................... 426/335; 426/532; 426/626; 426/807
[58] Field of Search .................................. 426/335, 626, 426/532, 807

[56] References Cited

U.S. PATENT DOCUMENTS

| | | | |
|---|---|---|---|
| 2,346,072 | 4/1944 | Haskell | 426/69 |
| 4,508,737 | 4/1985 | Forest et al. | 426/54 |
| 4,743,454 | 5/1988 | Tomes | 426/61 |
| 5,314,700 | 5/1994 | Barnes et al. | 424/684 |
| 5,374,425 | 12/1994 | Porter | 424/93.45 |
| 5,498,434 | 3/1996 | Johnston | 426/541 |
| 5,503,868 | 4/1996 | Fallin et al. | 426/656 |
| 5,567,457 | 10/1996 | Martinek et al. | 426/233 |

OTHER PUBLICATIONS

Cullison, "Feeds and Feeding", Reston Publishing Co., Inc. Reston, Va., pp. 236–240 (1982).

Domracheva, "Chemical Preservatives and Bacterial Leavens In the Ensilage of Feeds", Inst Selsk. Khoc (1973) (Translation of Russian Article).

"EUROSI" Brochure, Timac UK Ltd. (1994) (Incomplete pp. 8, 9).

*Primary Examiner*—Helen Pratt
*Attorney, Agent, or Firm*—MacMillan, Sobanski & Todd

[57] ABSTRACT

A method for preserving animal feed involves treating the animal feed with an inorganic acid having a $pK_a$ from 1.0 to 5.0 to reduce the pH of the animal feed to less than 4.5. Sodium bisulfate is a preferred inorganic acid. Preferably, the acid is substantially completely dissolved and is substantially uniformly distributed throughout the animal feed. In a preferred method, the animal feed is treated by mixing the animal feed with a dry acid and applying steam to the mixture. An animal feed composition contains a feed grain and an inorganic acid having a $pK_a$ from 1.0 to 5.0, where the acid is present in an amount sufficient to reduce the pH of the animal feed to less than 4.5.

20 Claims, 1 Drawing Sheet

METHOD FOR PRESERVING ANIMAL FEED WITH SODIUM BISULFATE AND COMPOSITION THEREOF

BACKGROUND OF THE INVENTION

This invention relates in general to additives for use in animal feeds, and in particular to the use of sodium bisulfate as a preservative in animal feeds to prevent the growth of mold and fungus.

Poultry production and livestock production are major industries in this country. The market for chickens and turkeys alone has greatly increased in recent years. In a successful operation, the animals are fed with animal feeds that provide the necessary ingredients for optimum growth and health of the animals. At the same time, the cost of the animal feed is important because of the competitive nature of the industries.

Typical animal feeds include feed grains such as corn to provide carbohydrates and fiber, protein sources such as soybean meal, and other ingredients. The feed grains are harvested and processed into animal feed, and the animal feed is transported and stored prior to feeding the animals. Unfortunately, the feed grains and other ingredients of the animal feed may grow mold and/or fungus after a period of storage when their moisture content is sufficiently high. The presence of mold or fungus can destroy the usefulness of the animal feed.

Accordingly, it is known to include various additives in animal feeds to inhibit the growth of mold and fungus. One such additive is propionic acid, which is an organic acid. The addition of propionic acid to animal feeds has several drawbacks, however. The propionic acid is relatively expensive so that it increases the cost of the animal feed. This generally limits its use. Further, the propionic acid is not totally effective in the prevention of mold and fungus. Another problem is that the propionic acid may raise safety concerns in the handling of the acid. Other known additives for inhibiting mold and fungus growth in animal feeds have similar drawbacks. Thus, it would be desirable to provide a method for preventing the growth of mold and fungus in animal feeds which overcomes the problems associated with previous additives.

SUMMARY OF THE INVENTION

This invention relates to an improved method for preserving animal feed to prevent the growth of mold and fungus. The method is particularly useful for preserving animal feeds containing a feed grain such as corn. In the method, the animal feed is treated with an inorganic acid having a $pK_a$ from about 1.0 to about 5.0 to reduce the pH of the animal feed to less than about 4.5. Sodium bisulfate is a particularly preferred inorganic acid. Usually, the animal feed is treated with from about 2 pounds (4.4 kilograms) to about 10 pounds (22 kilograms) of acid per ton of animal feed. Preferably, the acid is substantially completely dissolved and is substantially uniformly distributed throughout the animal feed. In a preferred method, the animal feed is treated by mixing it with a dry acid and applying steam to the mixture. The animal feed has no observable mold 14 days after treatment, when stored at 72° F. (21° C.) temperature and 70% relative humidity. The invention also relates to an animal feed composition comprising a feed grain and an inorganic acid having a $pK_a$ from about 1.0 to about 5.0, wherein the acid is present in an amount sufficient to reduce the pH of the feed grain to less than about 4.5.

It was not previously thought to use inorganic acids having a $pK_a$ from about 1.0 to about 5.0 to prevent the growth of mold and fungus in animal feed. Organic acids such as propionic acid are a common ingredient in foods because they are digestible. In contrast, inorganic acids such as sodium bisulfate are not considered as food. Further, it was not evident that it would be beneficial to reduce the pH of the animal feed to a lower pH than can be achieved with the organic acids. There was clearly no suggestion to use inorganic acids within a specific $pK_a$ range to effectively prevent the growth of mold and fungus without degrading the ingredients of the animal feed. It had to be determined how to incorporate the inorganic acid into an animal feed manufacturing process, and how to process the mixture of acid and animal feed to provide effective protection against mold and fungus.

The sodium bisulfate for use in the invention is significantly less expensive than propionic acid. Consequently, animal feeds treated with sodium bisulfate have a significant cost advantage compared to animal feeds treated with propionic acid. Moreover, the sodium bisulfate is more effective in preventing the growth of mold and fungus in animal feeds. At the same time, the sodium bisulfate is safer to handle than propionic acid. Thus, the use of sodium bisulfate as a feed preservative is an excellent fit for the poultry and livestock industries.

Various objects and advantages of this invention will become apparent to those skilled in the art from the following detailed description of the preferred embodiment.

DETAILED DESCRIPTION OF THE PREFERRED EMBODIMENT

Figure 1:
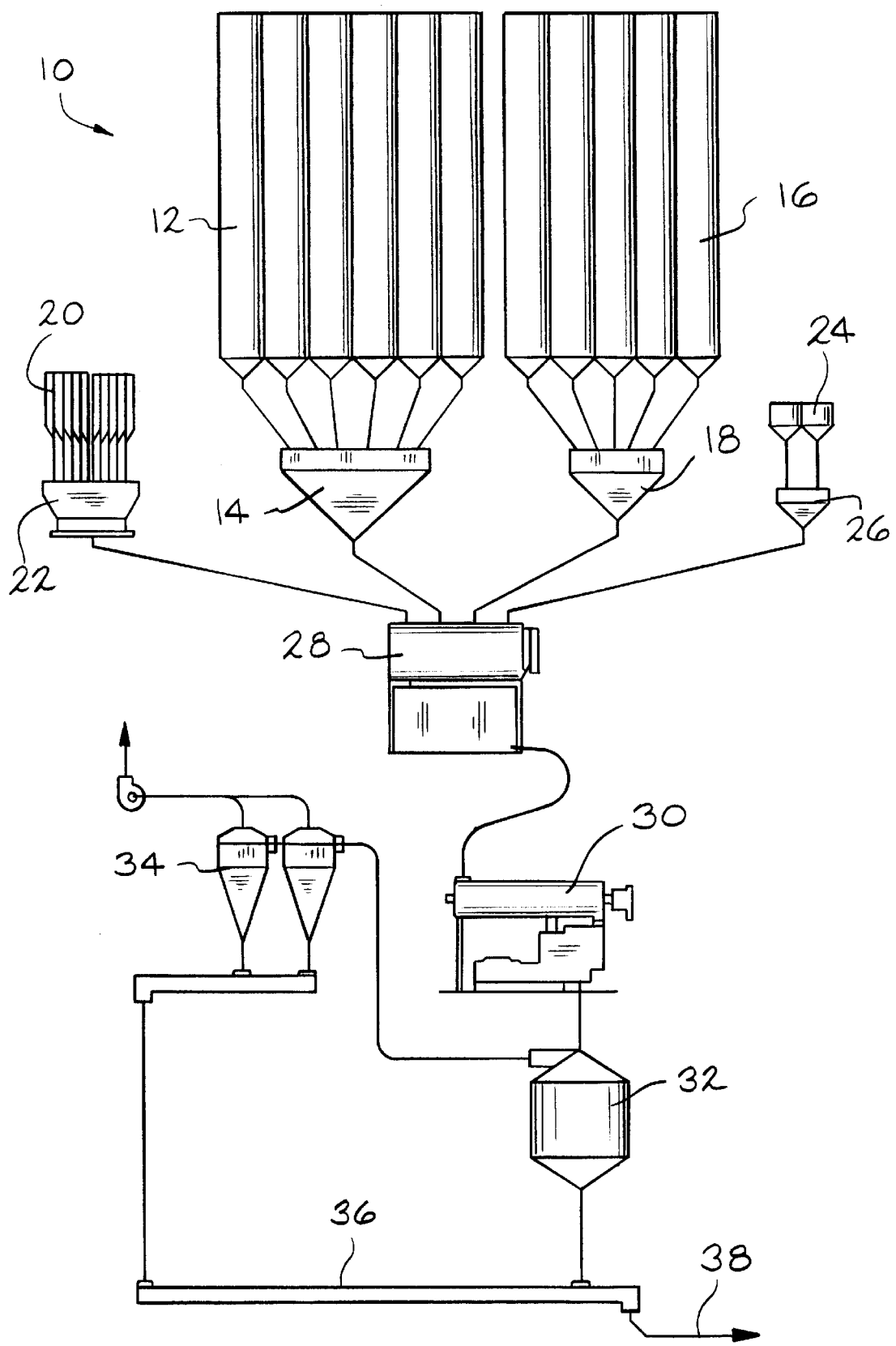
FIG. 1 is a schematic view of processing equipment suitable for manufacturing chicken feed according to the invention.

The present invention relates to a method of preserving animal feed. The animal feed can be any type of feed suitable for animals such as chickens (e.g., broilers), turkeys, hogs, cattle, horses or sheep. Preferably, the animal feed is poultry feed for chickens, turkeys or ducks.

The animal feed usually includes at least about 50% feed grain by weight, and typically from about 60% to about 70%. The feed grain can by any type of feed grain, such as corn, wheat, grain sorghums, oats or barley. More preferably, the feed grain is corn such as yellow corn. The corn is usually ground for manufacturing the animal feed, but whole corn can also be used. In addition to the feed grain, the animal feed can also include other conventional ingredients. Such ingredients may include protein sources such as soybean meal, fillers such as limestone, phosphates and salts. Ingredients added in small amounts ("microingredients") may include antibiotics, vitamins and minerals.

The animal feed is treated with an acid to reduce the pH of the animal feed to less than about 4.5. It is believed that reducing the pH of the animal feed to less than about 4.5 is very effective in preserving the animal feed by preventing the growth of mold and fungus. Preferably, the pH of the animal feed is reduced to less than about 4.0, and more preferably less than about 3.5. The animal feed is treated with from about 1 pound (2.2 kilograms) to about 15 pounds (33 kilograms) of acid per ton of animal feed. Usually, the animal feed is treated with from about 2 pounds (4.4 kilograms) to about 10 pounds (22 kilograms) of acid per ton of animal feed, preferably from about 4 pounds (8.8 kilograms) to about 8 pounds (17.6 kilograms) of acid per ton of animal feed, and more preferably about 5 pounds (11 kilograms) of acid per ton of animal feed.

The acid can be added separately to the animal feed, or the acid can be added as a mixture with other ingredients. For example, the acid may be added in a premix which contains other ingredients such as vitamins and nutrients. Thus, the present invention includes addition to the animal feed of any blend or mixture which includes the acid.

The type of acid used to treat the animal feed is critical to the invention. The animal feed is treated with an inorganic acid having a $pK_a$ from about 1.0 to about 5.0, and preferably from about 1.0 to about 3.0. It is believed that an inorganic acid having a low $pK_a$ within this range is more effective in preventing the growth of mold and fungus than acids having higher $pK_a$'s. However, if the $pK_a$ of the inorganic acid is too low, the acid may degrade the corn or other ingredients of the animal feed. An inorganic acid having a very low $pK_a$ would also be unsuitable for use in an animal feed manufacturing process because of difficulties in handling the acid, and volatile reactions of the acid with moisture. Suitable inorganic acids include sodium bisulfate, sulfamic acid, sulfurous acid and phosphoric acid. Sodium bisulfate has a $pK_a$ of 1.9. Preferably, the inorganic acid is a dry acid such as sodium bisulfate or sulfamic acid. In contrast to sodium bisulfate, propionic acid is a liquid acid having a $pK_a$ of 4.8.

Sodium bisulfate is a highly preferred inorganic acid for use in the invention. This acid is believed to be very effective in preventing the growth of mold and fungus in animal feed, particularly in preventing the growth of mold and fungus on feed grains such as corn. Moreover, sodium bisulfate is very safe to handle. The acid is a dry acid which can be handled without harm to the skin. Sodium bisulfate is also safe for ingestion by animals. A recent informal review opinion from the Food and Drug Administration has approved the use of sodium bisulfate as an additive in animal feed. A preferred sodium bisulfate is manufactured by Jones-Hamilton Co., 30354 Tracy Road, Walbridge, Ohio 43465. The Jones-Hamilton sodium bisulfate is certified under ISO 9002, meets Food Chemicals Codex specifications, and is classified as nonhazardous by the Department of Transportation.

In treating the animal feed, it is important for the acid to be substantially completely dissolved to effectively reduce the pH of the animal feed. There are several ways to accomplish this. In a preferred method, a dry acid such as sodium bisulfate is mixed with the animal feed. Steam is then applied to the mixture of acid and animal feed so that the acid becomes dissolved. Preferably, the mixture of acid and animal feed is further mixed while steaming. Another preferred method for dissolving the acid uses a dry acid which is hygroscopic (readily absorbs moisture). The hygroscopic acid is mixed with animal feed having a sufficient moisture content so that the acid absorbs moisture from the animal feed and is dissolved. In another method, the acid is first dissolved in water to make an acid solution, and then the acid solution is applied to the animal feed.

Preferably, the animal feed and the acid are thoroughly mixed so that the acid is substantially uniformly distributed throughout the animal feed. The uniform distribution of the acid throughout the animal feed can be measured by taking a series of small samplings at different locations in the animal feed. It is also preferred that the surface area of the animal feed is substantially completely covered by the acid. Complete coverage is particularly effective in preventing the growth of mold and fungus on the animal feed. Any uncovered surface area is not protected, so mold and fungus can grow in that area.

The animal feed treated according to the invention has no observable mold 14 days after treatment, when stored at 72° F. (21° C.) temperature and 70% relative humidity. Thus, the animal feed remains useful after an extended period of storage, resulting in less waste of animal feed and lower costs to the customer.

The animal feed will usually have a moisture content of at least about 15–20%, and often from about 25% to about 40%. At these moisture contents, the animal feed would be susceptible to the growth of mold and fungus after storage if it was not treated according to the invention.

EXAMPLE

Referring now to the drawing, FIG. 1 shows an example of processing equipment 10 suitable for manufacturing chicken feed according to the invention. The equipment includes main ingredient bins 12 which usually hold ground corn and soybean meal, and may also hold other ingredients such as wheat, grain sorghum, corn gluten and/or meat and bone meal. The main ingredients are weighed in a scale 14. The equipment also includes solid additive bins 16 which hold additives such as limestone, dicalcium phosphate, salt and/or methionine. The solid additives are weighed in a scale 18. The equipment also includes micro-ingredient bins 20. It has been determined that the sodium bisulfate of the invention can be effectively introduced into the process by holding the acid in one or more of the micro-ingredient bins. Other micro-ingredients can include antibiotics, vitamins and minerals. The micro-ingredients are weighed in a scale 22. The liquid additive bins 24 may hold additives such as liquefied fats. The liquid additives are weighed in a scale 26. The main ingredients, solid additives, micro-ingredients and liquid additives are fed to a batch mixer 28. The batch mixer blends the ingredients together to make a uniform mixture of ingredients. Suitable mixing equipment is known to persons working in the field of animal feeds, and include various types of continuous and batch mixers. The ingredient mixture is then fed to a conditioner 30. The conditioner applies steam and heat (e.g., 190° F. [88° C.]) to the ingredient mixture, and further mixes the ingredients by agitation. As a result, the sodium bisulfate becomes substantially completely dissolved and is substantially uniformly distributed throughout the ingredient mixture. The sodium bisulfate effectively covers the surface area of the ingredients. The ingredient mixture is then fed to an expander 32 where the mixture is subjected to heat and vacuum. This makes the ingredients more easily digestible by beginning the breakdown of the complex carbohydrates and increasing the surface area of the ingredients. A vacuum source 34 is connected to the expander 32. The ingredient mixture is then fed to a pellet mill 36 where the mixture is compressed and shaped into pellets 38 of chicken feed. Alternatively, the chicken feed could be formed into crumbles, cubes, or other shaped pieces. The chicken feed pellets are then cooled, conveyed to storage tanks, and loaded into trucks for transport to customers.

The chicken feed usually contains from about 60% to about 70% corn by weight of the feed. The sodium bisulfate is preferably added in the amount of about 5 pounds (11 kilograms) of acid per ton of chicken feed. The addition of the sodium bisulfate reduces the pH of the chicken feed pellets to about 3.8. The chicken feed pellets usually contain about 15% moisture. The pellets have no observable mold 14 days after treatment, when stored at 72° F (21° C.) temperature and 70% relative humidity.

DEFINITIONS AND METHODS

The $pK_a$ of an acid is the dissociation constant of the acid. The $pK_a$ is a measure of the strength of an acid: the lower the $pK_a$, the stronger the acid. The $pK_a$'s of acids are known and can be determined by consulting a reference table.

The pH is a value which represents the acidity or alkalinity of an aqueous solution of a material: the lower the pH, the more acidic the solution. The pH of the animal feed is measured by mixing equal weights of animal feed and distilled water, allowing the aqueous solution of animal feed to stand for 30 minutes, and measuring the pH of the solution with a pH meter such as an Accumet pH meter.

The presence of mold on the treated animal feed is determined by visual appraisal and odor. Molding is scored on a scale of 0 to 10, with 0 indicating no molding and 10 indicating severe molding. Scoring is done by consensus of two judges. "No observable mold" means a mold score of 0. The presence of mold is determined 14 days after treatment of the animal feed, when the animal feed has been stored at 72° F. (21° C.) temperature and 70% relative humidity.

Sodium bisulfate is a sodium salt of sulfuric acid generally expressed as $NaHSO_4$. The Jones-Hamilton sodium bisulfate product contains about 93% sodium bisulfate and about 7% sodium sulfate by weight. (In determining the pounds of acid per ton of animal feed according to the invention, the amount of product added is adjusted based on the actual content of sodium bisulfate. For example, 2.15 pounds of the Jones-Hamilton product would be used in order to add 2 pounds of sodium bisulfate. The remaining ingredient(s) in the product are ignored in these calculations.) The Jones-Hamilton product is a dry, crystalline solid having a spherical shape approximately 0.74 mm (0.03 inch) in diameter. The product is hygroscopic and is readily soluble in water.

The method for treating animal feed according to the invention is not intended to include the treatment of silage. Silage is stored in bulk under anaerobic conditions so that fermentation occurs. In contrast, the present method involves treating animal feed to reduce the pH and prevent mold growth under aerobic conditions. Usually, the treated animal feed is processed into a final product such as pellets.

The principle and mode of operation of this invention have been explained in its preferred embodiments. However, it must be understood that this invention may be practiced otherwise than as specifically explained without departing from its spirit or scope.

What is claimed is:

1. A method for preserving animal feed stored under aerobic conditions comprising treating the animal feed with an inorganic acid selected from the group consisting of sodium bisulfate, sulfamic acid, sulfurous acid and phosphoric acid having a $pK_a$ from about 1.0 to about 5.0 to reduce the pH of the animal feed to less than about 4.5, and storing the animal feed under aerobic conditions.

2. The method defined in claim 1 wherein the inorganic acid is produced by hydration of sodium bisulfate.

3. The method defined in claim 2 wherein the animal feed is treated with from about 2 pounds (4.4 kilograms) to about 10 pounds (22 kilograms) of sodium bisulfate per ton of animal feed.

4. The method defined in claim 2 wherein the sodium bisulfate is substantially completely dissolved in water.

5. The method defined in claim 1 wherein the pH of the animal feed is reduced to less than about 4.0.

6. The method defined in claim 1 wherein the acid is substantially uniformly distributed throughout the animal feed.

7. The method defined in claim 1 wherein the surface area of the animal feed is substantially completely covered by the acid.

8. The method defined in claim 1 wherein the animal feed is treated with sufficient acid so that the animal feed has no observable mold 14 days after treatment, when stored at 72° F. (21° C.) temperature and 70% relative humidity.

9. The method defined in claim 1 wherein the animal feed is treated by mixing the animal feed with a dry material selected from dry inorganic acids and dry salts which produce inorganic acids upon hydration and applying steam to the mixture of animal feed and dry material.

10. The method defined in claim 1 wherein the animal feed includes at least about 50% corn by weight.

11. A preserved animal feed composition comprising a feed grain stored under aerobic conditions and an inorganic acid selected from the group consisting of sodium bisulfate, sulfamic acid, sulfurous acid and phosphoric acid having a $pK_a$ from about 1.0 to about 5.0, wherein the acid is present in an amount sufficient to reduce the pH of the animal feed to less than about 4.5.

12. The animal feed composition defined in claim 11 wherein the inorganic acid is produced by hydration of sodium bisulfate.

13. The animal feed composition defined in claim 12 comprising from about 2 pounds (4.4 kilograms) to about 10 pounds (22 kilograms) of sodium bisulfate per ton of feed grain, as measured prior to hydration of the sodium bisulfate.

14. The animal feed composition defined in claim 11 wherein the animal feed has a moisture content of at least about 15%.

15. The animal feed composition defined in claim 11 wherein the animal feed includes at least about 50% corn by weight.

16. A method for manufacturing and preserving an animal feed composition stored under aerobic conditions comprising mixing a feed grain with a dry material selected from dry inorganic acids and dry salts which produce the inorganic acids upon hydration, the inorganic acids having a $pK_a$ from about 1.0 to about 5.0, and applying steam and further mixing the feed grain and d material, to dissolve the dry material and reduce the pH of the animal feed composition to less than about 4.5, and storing the animal feed composition under aerobic conditions.

17. The method defined in claim 16 wherein the dry material is sodium bisulfate.

18. The method defined in claim 16 wherein the dissolved dry material is relatively uniformly distributed throughout the feed grain.

19. The method defined in claim 16 wherein the surface area of the feed grain is substantially completely covered by the dissolved dry material.

20. The method defined in claim 16 wherein the feed grain is corn.

* * * * *